US005766464A

United States Patent [19]
Campbell

[11] Patent Number: 5,766,464
[45] Date of Patent: Jun. 16, 1998

[54] FLUID FILTRATION SYSTEM POSITIONABLE WITHIN A FLUID-CONTAINING APPARATUS

[76] Inventor: David C. Campbell, 1129 Edenbridge Way, Knoxville, Tenn. 37923

[21] Appl. No.: 562,302

[22] Filed: Nov. 22, 1995

[51] Int. Cl.$^6$ .................................................. B01D 15/00
[52] U.S. Cl. ........................ 210/251; 174/14 R; 210/282
[58] Field of Search ........................... 210/167, 172, 210/249, 251, 257.1, 266, 282, 416.1, 258, 243; 174/14 R

[56] References Cited

U.S. PATENT DOCUMENTS

| | | | |
|---|---|---|---|
| 2,341,058 | 2/1944 | Paluev | 210/266 |
| 2,405,853 | 8/1946 | Rosch | 210/203 |
| 4,124,834 | 11/1978 | Walsh | 336/58 |
| 4,419,236 | 12/1983 | Hsu | 210/282 |
| 4,437,082 | 3/1984 | Walsh et al. | 336/58 |
| 4,472,700 | 9/1984 | Gentzkow et al. | 336/57 |
| 4,756,826 | 7/1988 | Horvath | 210/167 |
| 4,828,691 | 5/1989 | Abbott et al. | 210/167 |

Primary Examiner—Ivars Cintins
Attorney, Agent, or Firm—Michael E. McKee

[57] ABSTRACT

A fluid filtration system for use with an apparatus, such as an electrical apparatus, having a casing within a working fluid, such as oil, is contained utilizes a filter-supporting flow conduit having an entrance end and an exit end and a filter medium supported within conduit. A pump is also associated with the filter-supporting means for pumping working fluid through the flow conduit between the entrance and the exit ends thereof so that contaminants are filtered from the fluid as it is pumped through the flow conduit. The flow conduit and the pump are adapted to be positioned in a submerged condition within the fluid of the apparatus, and a tension member is used to suspend the flow conduit in a substantially vertical orientation within the fluid so that the entrance end of the conduit is disposed adjacent the bottom of the apparatus casing. By filtering the fluid with the filtration system, the service life of the fluid is extended and the need for frequent servicing of the fluid is obviated.

9 Claims, 2 Drawing Sheets

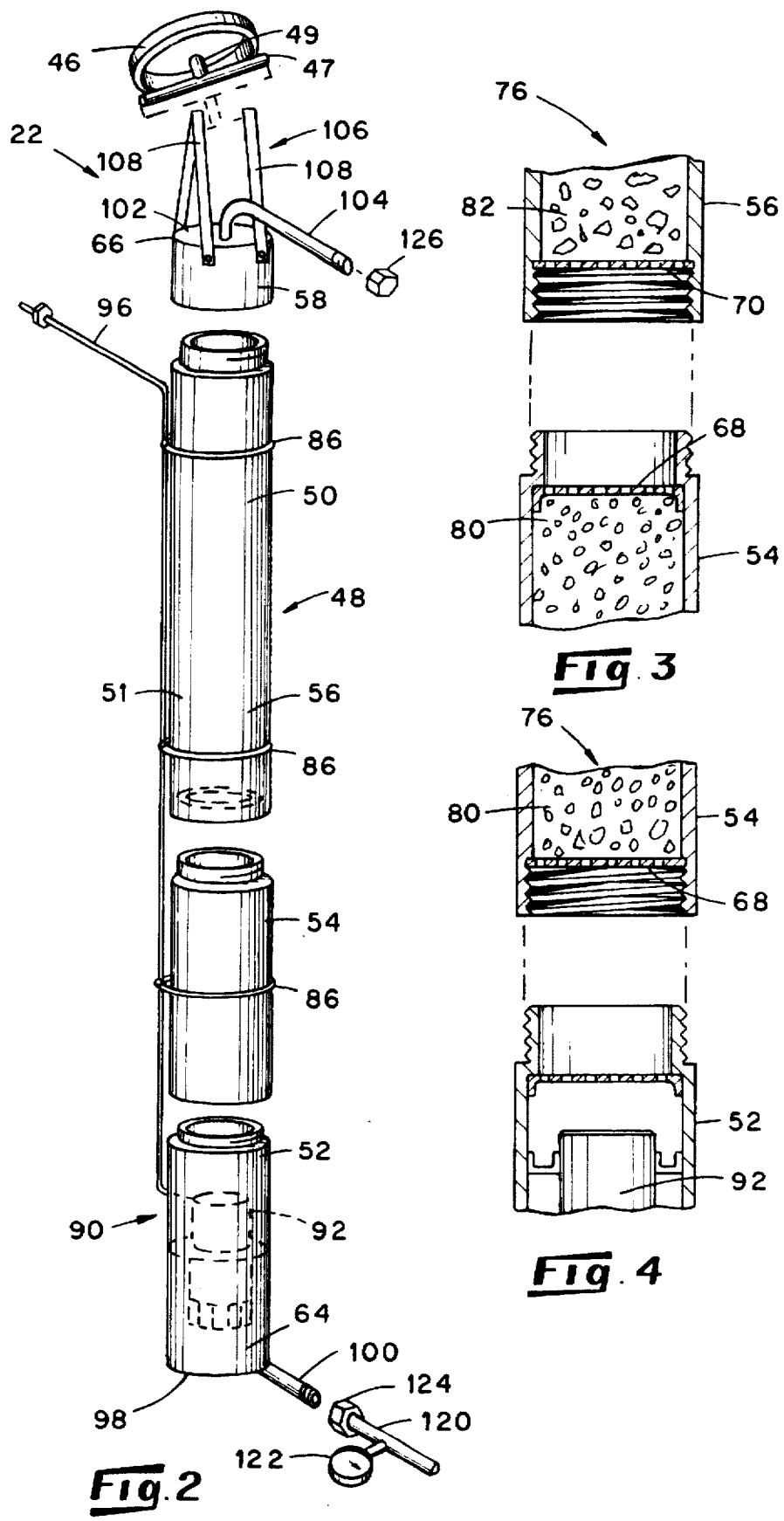

FLUID FILTRATION SYSTEM POSITIONABLE WITHIN A FLUID-CONTAINING APPARATUS

BACKGROUND OF THE INVENTION

This invention relates generally to apparatus having a casing within which a working fluid is contained, and relates, more particularly, to means and methods for filtering the fluid contained within such apparatus.

The class of apparatus with which this invention is concerned includes those having a casing and an amount of fluid contained within the casing and wherein it is desirable that the fluid be maintained in a relatively clean condition for effective operation of the fluid and/or apparatus. Such apparatus includes electrical apparatus within which a dielectric fluid is contained, engines having crankcases within which lubricating oil is contained and hydraulic systems containing a reservoir of hydraulic working fluid.

One electrical apparatus of this class is a transformer having an electrical winding which is supported within a bath of dielectric fluid, such as oil, which insulates, as well as cools, the transformer windings. It is known that the dielectric fluid in such apparatus tends to accumulate moisture and by-products of the break-down of materials of apparatus construction, such as paper insulation, so that the service quality (i.e. the insulating and cooling quality) of the fluid is adversely effected. Furthermore, acids and sludges may accumulate within the fluid which, when mixed with atmospheric moisture or moisture generated from the degradation of apparatus materials such as the aforementioned paper insulation, form compounds which adversely affect fluid quality and fluid service life.

Each of U.S. Pats. Nos. 4,124,834, 4,437,082 and 4,472,700 describe systems for filtering the fluid of an electrical apparatus of this class, but these systems are mounted external to the apparatus and the possibility of fluid leakage must be taken into account in the designs of these systems.

It is an object of the present invention to provide a new and improved fluid filtration system for use with a fluid-containing apparatus for maintaining high levels of fluid quality and thereby extend the service life of the fluid and a method of installing the system within such an apparatus.

Another object of the present invention is to provide such a system wherein fluid leakage from the system is not likely to be as harmful to the apparatus with which it is used or to the environment as it is with the externally-mounted systems of the referenced patents.

Still another object of the present invention is to provide such a system which is particularly well-suited for use with electrical apparatus, such as an oil-filled transformer.

Yet another object of the present invention is to provide such a system which is uncomplicated in construction and effective in operation.

SUMMARY OF THE INVENTION

This invention resides in a fluid filtration system for use with a fluid-containing apparatus having a casing within which the fluid of the apparatus is contained and a method of installation.

The system comprises filter-supporting means including a flow conduit having an entrance end and an exit end and a filter medium supported within the flow conduit. Means are also associated with the filter-supporting means for moving the fluid of the fluid-containing apparatus through the flow conduit between the entrance end and the exit end thereof. The filter-supporting means and the associated means are adapted to be positioned with the casing of the apparatus within which the fluid is contained for use of the system.

Because the filter-supporting means and the associated means of the filtration system are positionable within the casing of the apparatus for use of the system, less attention may be given to the possibility of fluid leakage from the system components.

The method of the invention includes the steps involved in installing an embodiment of the fluid filtration system within the fluid of a fluid-containing apparatus wherein the interior of the flow conduit of such embodiment is substantially evacuated of gas and each of the entrance and exit ends of the flow conduit are sealed with removable closures. More specifically, the method includes the steps of positioning the flow conduit of the fluid filtration system within the fluid of the fluid-containing apparatus so that the entrance and exit ends of the flow conduit are positioned beneath the upper level of the fluid. The closure is removed from one of the entrance and exit ends of the flow conduit following the positioning of said one end beneath the upper level of the fluid, and the closure is removed from the other of the entrance and exit ends of the flow conduit following the positioning of said other end beneath the upper level of the fluid.

BRIEF DESCRIPTION OF THE DRAWINGS

FIG. 2 is a perspective view of the filtration system embodiment of FIG. 1, shown exploded.

FIG. 3 is an elevational view of one fragment of the FIG. 2 embodiment, drawn to a slightly larger scale and shown partly cut-away.

FIG. 4 is an elevational view of another fragment of the FIG. 2 embodiment, drawn to a slightly larger scale and shown partly cut-away.

Detailed Description of the Illustrated Embodiment

Figure 1:
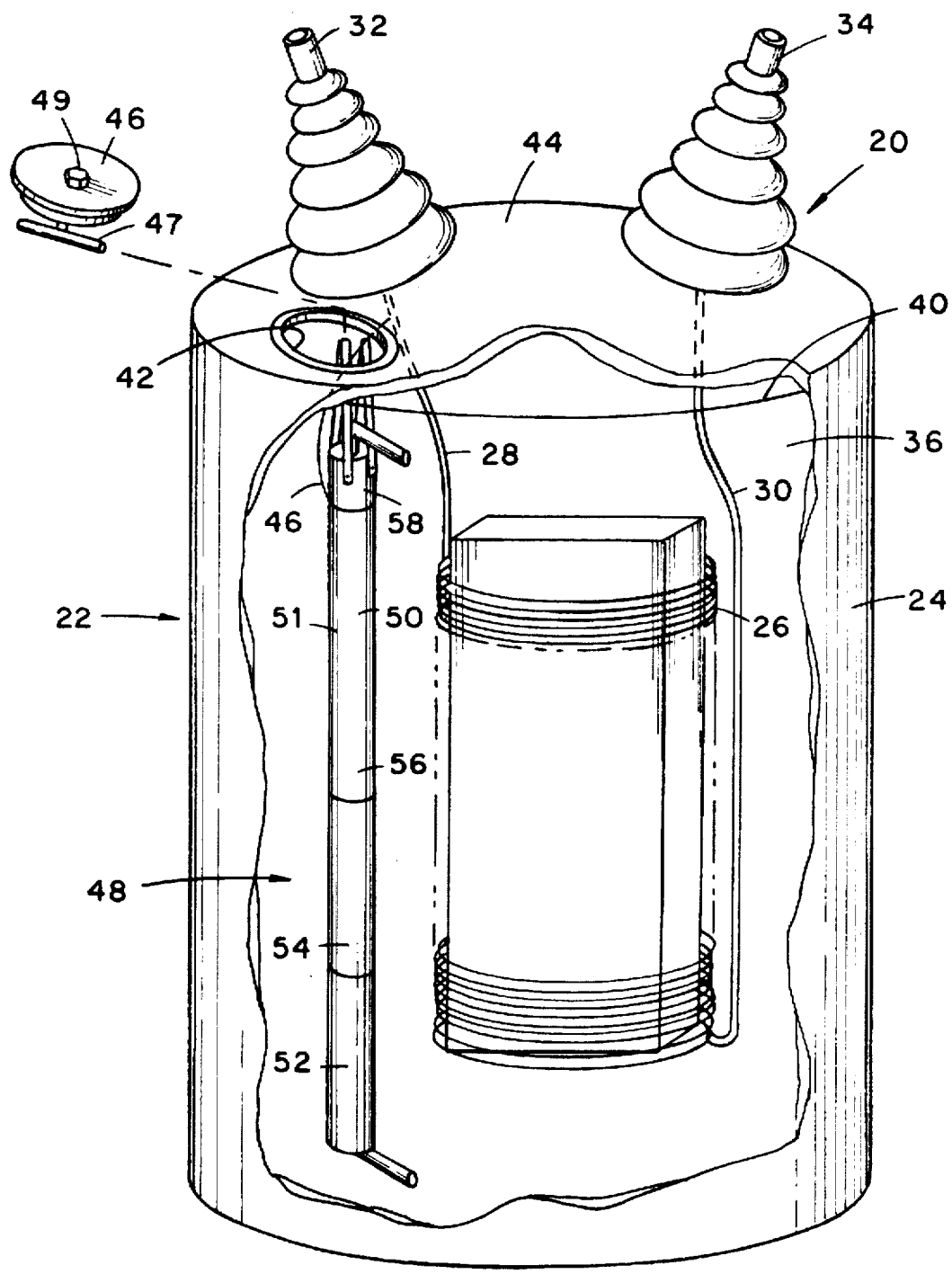
FIG. 1 is a perspective view, shown partly cut-away, of a transformer within which an embodiment of an oil filtration system is utilized.

Turning now to the drawings in greater detail and considering first FIG. 1, there is shown a transformer 20 and an embodiment of an oil filtration system, generally indicated 22, supported within the transformer 20. The transformer 20 includes an outer casing 24 and electrical windings 26 mounted within the casing 24. The windings 26 of the transformer 20 include lead portions 28, 30 which are connected to transformer terminals 32, 34 from which electrical power is routed into or out of the transformer 20. For purposes of insulating and cooling the windings 26 of the transformer 20, the casing 24 is filled with oil 36 to the level 40 so that the windings 26 are totally submerged within the oil 36.

Although the embodiment 22 is described herein for use with a fluid-containing transformer 20, it will be understood that an embodiment of the invention may be used in connection with other types of fluid-containing apparatus in which the fluid is normally subject to occasional servicing due to a build up of sludge or other contaminants within the fluid. Other such apparatus include electrical apparatus (other than a transformer) within which a dielectric fluid is contained, engines having crankcases within which lubricating oil is contained and hydraulic systems containing a reservoir of hydraulic working fluid. Since the filtration system described herein is intended to reduce the need to service fluid as frequently as would otherwise be necessary, the system is believed to be well-suited for filtering working fluid used in an application, such as in a remote environment, wherein the application renders frequent servicing of the fluid difficult or expensive. Accordingly, the principles of the present invention can be variously applied.

To position the embodiment 22 within the transformer 20, the embodiment 22 is lowered through an access port 42 provided in the upper end wall, indicated 44, of the casing 24 intended to accommodate occasional servicing within the interior of the transformer 20. The access port 42 of the transformer 20, as are the access ports of many large oil-containing transformers, is generally oval in shape (so that the port opening has a shorter length as measured across its minor axis than its length as measured across its major axis) and is capped with a removable cover 46.

The means by which the cover 46 is attached across the oval-shaped opening of the port 42 is well known so that a detailed description of such means is not believed to be necessary. Suffice it to say, and as best shown in FIG. 2, there is associated with the cover 46 a generally horizontally-extending rod 47 which is supported beneath the cover 46 at the end of a headed rod 49 which, in turn, extends upwardly through the center of the cover 46. The length of the rod 47 is shorter than the length of the major axis of the port opening but longer that the length of the minor axis of the port opening so that by appropriately aligning the rod 47 with the port opening, the cover 46 can be lowered into place over the port 46 as the rod 47 is accepted sideways through the port opening. Upon receipt by the port opening in this manner, the rod 47 can be rotated ninety degrees (in a horizontal plane) by way of the headed rod 49 and tightened against the underside of the mouth of the port 42 so that the mouth of the port 42 is sandwiched between the rod 47 and the cover 46. As will be apparent herein, the cover 46 and the horizontally-extending rod 47 provide suitable means from which the system 22 can be supported within the transformer casing 24.

With reference to FIG. 2, the embodiment 22 includes means, generally indicated 48, for providing a filter-supporting flow conduit 50 through which oil of the transformer 22 is routed. In the embodiment 22, the conduit-providing means 22 includes a walled vessel comprised, for example, of a tubular assembly 51 including a plurality of elongated tubular sections 52, 54, 56 and 58 which are releasably connected to one another in an end-to-end fashion to provide a single elongated tube having a lower end 64 and an upper end 66 through which oil is routed when the system is in operation. As will be apparent herein, the lower end 64 provides the entrance end of the conduit 50 and the upper end 64 provides the exit end of the conduit 50.

To facilitate the attachment of the sections 52, 54, 56 and 58 to one another and with reference to FIGS. 2-4, the lower end portion (as viewed in FIG. 2) of each of the sections 54, 56 or 58 is internally-threaded and the upper end portion (as viewed in FIG. 2) of each of the sections 52, 54 or 56 is externally-threaded and adapted to be threadably received by the corresponding internally-threaded end of the adjacent section 54, 56 or 58. It follows that when joined in the aforedescribed end-to-end manner, the longitudinal axis of the elongated sections 52, 54, 56 and 58 are substantially aligned with one another. In the embodiment 22, each tubular section 52, 54, 56 or 58 is comprised of a hard plastic, such as Nylon®, although other (e.g. non-conducting) materials can be used.

The embodiment 22 also includes filtering means, generally indicated 76 in FIGS. 3 and 4, supported within the conduit 50 for filtering the oil as it is routed between the lower and upper ends 64, 66. The choice of filter medium selected for use as the filter means 76 is largely dependent upon the type of contaminant (e.g. inorganic or organic) desired to be filtered from the oil routed therethrough. For example, if it is desired to remove moisture from the oil, the filter medium may be comprised of dry paper or an ion exchange resin. By comparison, if it is desired to remove organic and inorganic particles from the oil, the filter medium may be comprised of activated alumina or fullers earth.

In the depicted embodiment, one filter medium is supported in the tubular section 54 and another, albeit different, filter medium is supported in the tubular section 56. More specifically, the tubular section 54 is substantially filled with a desiccant material 80 (such as an ion exchange resin, such as Dowex®) adapted to filter moisture from the oil routed therethrough, and the tubular section 56 is substantially filled with an adsorption material, such as fullers earth 82, for filtering, principally by adsorption, organic and inorganic contaminants from the oil.

The filter medium 80 or 82 is supported within its corresponding tubular section 54 and 56 by way of a suitable closure member 68 or 70, such as a permeable screen, which plugs the interior of the tubular section at the opposite ends thereof. For preserving the effectiveness of the filter medium 80 or 82 until the section 54 or 56 is installed at a job site, each filter medium 80 or 82 is vacuum-sealed within the tubular assembly 51 in a manner described herein.

The embodiment 22 also includes means, generally indicated 90 in FIG. 2, for moving the oil upwardly through the conduit 50. In the depicted embodiment 50, the moving means 90 is provided by a submersible pump 92 which is supported within the tubular section 52 for pulling oil into the section 52 and subsequently pushing the oil from the section 52 in an upwardly direction through the sequentially-joined section 54, 56 and 58. Because the pump 92 is submersible, there is no need to isolate the pump components from the oil of the transformer, and the pump 92 is advantageous in this respect. The flow capacity of the pump 92 can be selected for the volumetric flow of oil desired to be pumped through the pump 92, and the pump 92 may be wired for continuous or intermittent operation. As a practical matter, a pump adapted to pump a relatively low flow rate (e.g. one to two gallons per minute) of oil will sufficiently circulate the volume of oil contained within a large transformer (i.e. a large gallon capacity) several times daily. Thus, it may be preferable from an energy-saving standpoint to select as the pump 92 a pump which is adapted to provide a low through-put of oil.

If the pump is electrically powered (as is the case with the depicted pump 92) and its operating voltage is equal to that of the transformer output voltage, the pump may, if desired, be wired to appropriate transformer components for receiving power therefrom. For example, the pump 92 of the depicted embodiment 22 is connected, by way of electrical wire 96, to transformer lead portion 28 (FIG. 1) for receiving power therefrom. Alternatively, electrical power can be routed to the pump 92 from, for example, a separate power source. In the depicted embodiment 22, the electrical power wire 96 is banded along the outer wall of the conduit 50 by means of plastic straps 86 banded thereabout. On the other hand, if the pump operating voltage is different from that of the output voltage of the transformer 20, the pump power may still be drawn from the transformer 20 if a suitable (e.g. step-down) transformer is appropriately wired between the pump and the transformer lead portions 28.

Also associated with the tubular section 52 within which the pump 92 is supported is an end cap 98 fixed across so as to cover the lower end of the section 52 and a flow tube 100 which is joined to so as to extend from the cap 98. During the operation of the pump 92, the transformer oil is initially drawn into the interior of the joined tubular sections 52, 54, 56 and 58 by way of the tube 100.

At the opposite, or upper, end of the system embodiment 22, the tubular section 58 is capped with a cap 102, and a flow tube 104 is joined to so as to extend from the cap 102. During operation of the system 22, oil is discharged from the interior of the joined tubular sections 52, 54, 56 and 58 by way of the tube 104.

It is a feature of the system 22 that its joined tubular sections 52, 54, 56 and 58 are adapted to be supported within the transformer 20 in a substantially vertical orientation. To this end, the embodiment 22 includes tension means, generally indicated 106, for suspending the joined tubular sections within the transformer oil from the upper end wall 44 (FIG. 1) of the transformer 20. In the depicted embodiment 22, the tension means 106 includes a pair of straps 108 comprised of a high-tensile strength material, such as Nylon®, which is fixedly joined, as with rivets, to the tubular section 58. Each of the straps 108 is adapted to be looped over a corresponding end of the horizontally-extending rod 47 associated with the cover 46 thereby enabling the system 22 to be suspended from the cover 46 during system operation and to be raised from and lowered into the transformer fluid 36 as the cover 46 is raised from or lowered onto the access port 42.

As mentioned earlier, the filter medium contained within the tubular assembly 51 is preferably vacuum-sealed to preserve the effectiveness of the filter medium prior to the installation of the system 22 within the transformer 20. In this connection, the interior of the joined tubular sections 52, 45, 56 and 58 are substantially evacuated of gas and the flow tubes 100 and 104 are sealed from the atmosphere with suitable closure members. In particular, tube 100 is sealed with a closed conduit 120 (to which a pressure gauge 122 is connected) by way of a female fitting 124 which is threaded about the tube end 100 in compression-fit arrangement. By comparison, tube 104 is sealed from the atmosphere by way of a closure cap 126 threaded about the end of the tube 104. Preferably, the joined tubular sections 52, 54, 56 and 58 are evacuated and sealed at the site of manufacture and delivered to the job site in an evacuated and sealed condition to reduce the likelihood that the filter medium will become contaminated or be reduced in effectiveness prior to installation. Until removed from the system 22, the pressure gauge 122 monitors the internal pressure of the joined tubular sections and enables installation personnel to quickly determine whether or not the system 22 has developed an undesirable leak.

To install the embodiment 22 (when in an assembled condition) within the transformer 20 and with reference still to FIG. 1, the cover 46 is removed from the access port 42 of the transformer 20, and the joined sections 52, 54, 56 and 58 (while still in a sealed condition) are slowly lowered into the oil of the transformer 20 as the joined sections are lowered pump-end-first. There exists a spacing between the outer walls of the transformer casing 24 and the electrical windings 26 housed therein, and it is into this spacing that the joined sections of the embodiment 22 are lowered. Accordingly, the outer diameter of the joined sections is sized to be received by the spacing when lowered therein. Similarly, the overall length of the joined sections of the conduit 50 can be selected for the individual application.

Once the flow tube 100 has been lowered beneath the upper level of the fluid 36, the conduit 120 (along with the pressure gauge 122) are removed from the feed tube 100 (by loosening and removing the female fitting 124) to expose the interior of the joined sections to the fluid. Upon removal of the conduit 120 from the tube 100, the fluid 36 begins to be drawn into the interior of the joined sections through the flow tube 100 under the influence of the vacuum. Thereafter, the system 22 continues to be lowered into the fluid 36 as the fluid is drawn into the joined sections until the end of the flow tube 104 is disposed beneath the upper level of the fluid 36. Upon positioning the flow tube 104 beneath the fluid level, the closure cap 126 is removed from the tube 104 thereby permitting fluid to flow through the joined sections. The advantage in removing the aforedescribed closure members from the flow tubes 100 and 104 while the tubes are positioned beneath the level of the fluid prevents the filter medium from being exposed unnecessarily to the atmosphere prior to its installation within the transformer 20.

Before lowering the system embodiment 22 to a lowermost position within the transformer 22, the support straps 108 are hooked upon the rod 47 associated with the cover 46, and the electrical wires leading from the pump 92 are connected to the lead portion 28 of the transformer terminal 32 for delivering electrical power to the pump 92. With the straps 108 hooked upon the rod 47, the cover 46 can be secured upon the access port 42 so that the system 22 is suspended from the cover 46 during system operation. Since the transformer 20 is switched OFF during servicing, no power is conducted through the terminals 22 during the hook-up of the pump wires. Thus, the pump 92 can begin operation as soon as the transformer 20 is once again energized.

During operation of the embodiment 22, oil which is positioned adjacent the bottom of the casing 24 is drawn through the flow tube 100 by the pump 92 and pushed upwardly through the joined tubular sections and out of the flow tube 104 disposed adjacent the upper level of the transformer oil. As the oil is pumped through the desiccant-containing section 54, moisture contained within the oil is collected by the desiccant material 80, and as the oil is pumped through the section 56, organic and inorganic contaminants contained within the oil are extracted therefrom and collected by the filter medium (e.g. fullers earth or activated alumina) contained within the section 56. It is believed that by initiating the collection of moisture and other contaminants from oil when the oil is in a clean condition, the build up of acids and sludge will be better prevented and the service life of the oil will be lengthened. Thus, it is preferable that the system embodiment 22 be installed and rendered operational as soon as the transformer 20 is rendered operational with clean oil contained in its casing 24.

The system embodiment 22 is further advantageous from a servicing standpoint. If, for example, it is desired to replace the pump or the filter materials contained within the system 22, the entire system 22 can be removed from the transformer 20 and replaced with a new system of like construction. If the exposure of the filter mediums of the individual tubular sections to the atmosphere is of little concern, any of the tubular sections can be removed from its adjacent section and replaced with another or similarly-constructed replacement section.

It will be understood that numerous modifications and substitutions can be had to the aforedescribed embodiment without departing from the spirit of the invention. For example, although the assembly of tubular sections 52, 54, 56 and 58 of the aforedescribed embodiment 22 has been shown and described as including a series of individual tubular sections which are joined together as a single unit, it will be understood that an embodiment in accordance with the broader aspects of the invention may be comprised of a single elongated tube within which one or more types of filter mediums are contained and within which a pump is supported. Furthermore, although the aforedescribed system embodiment 22 has been shown and described as including two different filter mediums, a system in accordance with the broader aspects of the invention may include an alternative number of filter mediums and filter mediums of differing amounts. For example, for use in an application situated in a dry climate, a system may be selected which contains little desiccant. Conversely, for use in an application situated in a humid climate, a system may be selected which employs a large amount of desiccant.

Further still, although the system 22 has been shown and described as being in the form of an add-to unit capable of installation within transformers in the field or new transformers installed at a job site, the invention can be embodied as an internal filtration system built into a transformer at time of manufacture. Accordingly, the aforedescribed embodiment is intended for the purpose of illustration and not as limitation.

What is claimed is:

1. An apparatus comprising
   an electrical device including a casing having walls for containing a dielectric fluid, an electrical winding supported within the dielectric fluid contained within the casing, and a service access port disposed above the fluid contained within the casing and wherein there exists a dielectric-filled spacing between the electrical winding of the device and a wall of the casing; and the apparatus further includes
   a filtering system positioned within the electrical device for filtering the dielectric fluid of the electrical device, wherein the filtering system includes
   a) a walled vessel including means providing a flow conduit having an entrance end through which a dielectric fluid enters the conduit and an exit end through which the dielectric fluid exits the conduit;
   b) a submersible pump associated with the conduit for moving the dielectric fluid through the conduit between the entrance and exit ends thereof and adapted for operation while positioned within the dielectric fluid; and
   c) a filter medium mounted within the conduit for filtering the dielectric fluid as the fluid is moved through the conduit as aforesaid, the vessel being constructed of an electrically nonconducting material to accommodate the positioning of the vessel, with its flow conduit, in a totally submersed condition within the dielectric fluid of the casing and so that both of the entrance and exit ends of the conduit are submerged within the dielectric fluid, and the vessel being elongated in form to accommodate the lowering of the vessel through the access opening of the electrical device and into a position within the dielectric fluid-spacing between the electrical winding of the device and a wall of the casing.

2. The apparatus as defined in claim 1 wherein the vessel of the system includes is a plurality of sections which are releasably attached to one another to permit the movement of fluid through the interior of the vessel between the entrance end and the exit end of the conduit-providing means.

3. The apparatus as defined in claim 1 wherein the pump of the system is an electrically-powered pump and the apparatus further includes means for withdrawing electrical operating power for the pump from the electrical device.

4. The apparatus as defined in claim 1 wherein the electrical device is a current/voltage transformer.

5. The apparatus as defined in claim 1 wherein the walled vessel includes one portion and another portion, the conduit of the conduit-providing means provides said one portion of the vessel, the pump is supported within said another portion of the vessel, and said another portion of the vessel is supported adjacent the entrance end of the conduit so that the pump which is supported within said another portion of the vessel pushes the dielectric fluid from the entrance end to the exit end.

6. The apparatus as defined in claim 5 wherein the vessel is comprised of a plurality of sections which are releasably attached to one another to permit the movement of fluid through the interior of the vessel between the entrance end and the exit end, and one of the sections is provided by said one portion of the vessel and another of the sections is provided by said another portion of the vessel.

7. The apparatus as defined in claim 1 wherein the filter medium includes at least two filter materials, and the filter materials are arranged within the vessel so that the fluid is moved in sequence through one filter material and then another filter material as it is moved from the entrance end to the exit end.

8. The system as defined in claim 1 wherein the system further includes means for supporting the vessel in a substantially vertical orientation within the fluid so that the entrance end of the conduit is disposed below the exit end thereof.

9. The system as defined in claim 8 wherein the means for supporting includes means for suspending the vessel in a substantially vertical orientation within the dielectric fluid.

* * * * *